March 20, 1945.  W. A. SCHULZE  2,371,848
PROCESS FOR THE PRODUCTION OF BUTADIENE
Filed Feb. 10, 1942
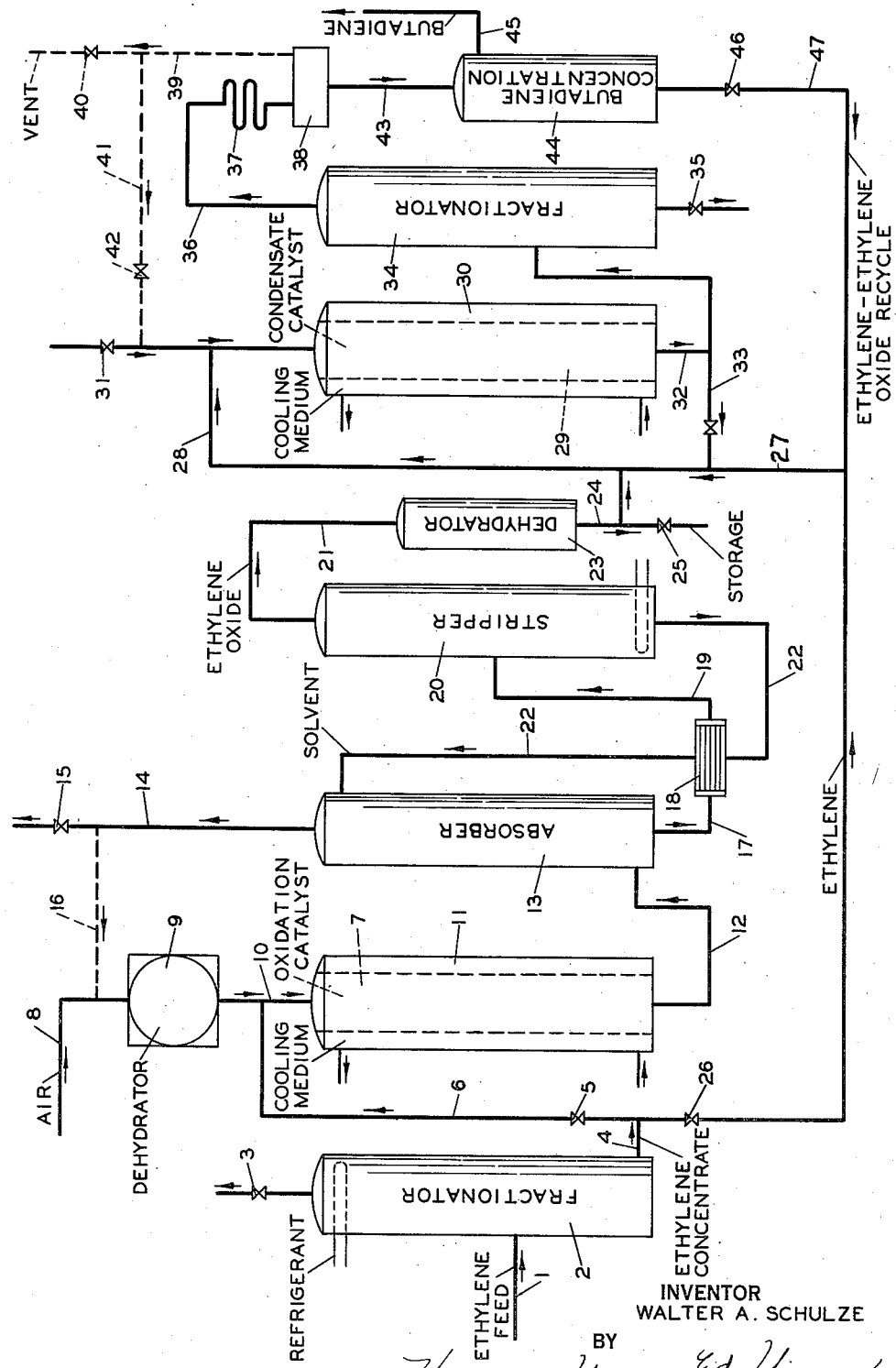
INVENTOR
WALTER A. SCHULZE
BY
Hudson, Young & Yunger
ATTORNEY Patented Mar. 20, 1945

2,371,848

UNITED STATES PATENT OFFICE 2,371,848

PROCESS FOR THE PRODUCTION OF BUTADIENE

Walter A. Schulze, Bartlesville, Okla., assignor to Phillips Petroleum Company, a corporation of Delaware Application February 10, 1942, Serial No. 430,280

6 Claims. (Cl. 260—680)

The present invention relates to the manufacture of diolefin hydrocarbons and more specifically to the production of butadiene from ethylene.

Various methods have been proposed for the production of butadiene, among them being dehydrogenation of the corresponding more saturated hydrocarbons, high temperature-low pressure cracking of propane and heavier stocks and chemical methods involving chlorination and subsequent removal of hydrogen chloride. Each of these methods has its limitations from a commercial viewpoint and hence butadiene is still a relatively expensive material.

I have now discovered a novel method for the manufacture of butadiene which overcomes many of the difficulties encountered in those processes now in use. An ethylene containing hydrocarbon stock is the starting material in my process. This ethylene may be produced by thermal cracking of ethane, propane, butane or heavier hydrocarbons under known conditions of temperature and pressure. If desired, the ethylene may be obtained by catalytic dehydrogenation or by catalytic cracking of hydrocarbons. The ethylene may be separated from the other hydrocarbons by low temperature fractionation or by other methods to the desired degree of purity. The presence of limited amounts of saturated hydrocarbons in the ethylene does not usually interfere greatly with the operation of my process although in some instances a rather high degree of purity may prove to be the most economical operation.

This invention involves the following steps:

(1) Separation of the ethylene-containing fluid into two streams, (2) Addition of an oxygen-containing gas to one of the ethylene streams and contacting the mixture with a suitable catalyst, preferably a silver catalyst, under conditions which cause the formation of ethylene oxide in substantial amounts and separating it from undesired products, and (3) Adding the ethylene oxide-containing stream to the ethylene stream and contacting the mixture with a Friedel-Crafts catalyst, whereby the said ethylene oxide and ethylene react to form butadiene and water according to the equation:

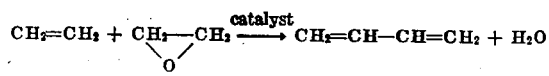

In order that the process may be more clearly understood, reference is made to the accompanying drawing, which shows diagrammatically one arrangement of apparatus suitable for the practice of my invention. A feed stock comprising $C_2$ and lighter hydrocarbons with substantial amounts of ethylene passes by line 1 to fractionator 2 which is operated to produce an ethylene rich bottom fraction. This fractionation may be accomplished at low temperatures and high pressures, or, if desired a selective solvent for the ethylene may be employed with secondary recovery means not shown. The methane and lighter fraction is removed through valve 3, while the ethylene concentrate passes into line 4 where it is split into two streams. One stream is vaporized and passes through valve 5 and line 6 to the oxidation step, while the other stream passes through valve 26 and line 27 to be utilized as described hereinafter.

The ethylene-containing stream passing through valve 5 and line 6 enters the top of catalytic converter 7 wherein it is mixed with dry air introduced through line 8, dryer 9 and line 10. Other suitable oxygen containing gases may, of course, be used instead of air at this point. The ethylene-oxygen gas mixture after mixing passes through the oxidation catalyst in the main portion of tower 7 which is enclosed in a heat transfer medium in jacket 11 for controlling the oxidation temperature. The effluent from the oxidation catalyst containing the products of partial oxidation of the ethylene is passed through line 12 with necessary cooling and/or compression (not shown) and into absorber 13. This absorber may be a packed or a multi-plate tower in which the gas stream travels upward against a downward stream of selective solvent for ethylene oxide absorption. The residue gases leave by line 14 and may be vented through valve 15 or wholly or partially recycled through line 16 to the air supply line. The rich absorbent leaves the absorber through line 17, and passes through heat exchange apparatus 18 and line 19 to stripping column 20. In the stripping column, sufficient heat is supplied to desorb the ethylene oxide from the absorbent which is then taken through line 22, through exchanger 18 to the top of absorber 13 for further absorption service. The substantially pure ethylene oxide is taken through line 21, dehydrator 23 and line 24 to immediate use in the process, or through valve 25 to storage facilities not shown.

The ethylene oxide from line 24 and ethylene-containing fluid from line 27 are then mixed in proper proportions and passed through line 28 to catalyst vessel 29. This vessel is charged with a metal halide condensation catalyst of the Friedel-Craft type as described in detail hereinafter. The mixture then passes through the catalyst in the main portion of vessel 29 which is enclosed in a jacket 30 containing a heat-exchange fluid to control reaction temperatures. If desired, various reaction promoters and catalyst activators may be added periodically or continuously to the inlet vapor stream through valve 31. After reaction in catalyst vessel 29, the effluents pass through line 32, with any desired volume being recycled for further conversion through line 33. The portion of the effluent stream which is to be treated for product recovery passes to separator or fractionator 34 which may serve primarily to separate small amounts of sludge or heavy products which are removed through valve 35. The light products pass overhead through line 36 and condenser 37 to accumulator 38, from which ethylene may be vented as a gas through line 39 and valve 40 and/or condensed to be utilized elsewhere in the system as may be most economical. Thus, ethylene may be recycled directly to the stream ahead of the condensation catalyst through line 41 and valve 42. The condensate is taken through line 43 to butadiene concentration unit 44, wherein butadiene is separated and withdrawn through line 45. The residue from unit 44 is removed through valve 46 and line 47 to the ethylene supply line 27. If desirable, auxiliary fractionation may be operated on the stream passing through line 47, although when it comprises essentially ethylene and small amounts of ethylene oxide, it is ordinarily recycled directly.

The oxidation step for the production of ethylene oxide is carried out along more or less conventional lines and the details may be varied considerably with requirements of specific installations. The ethylene content of the oxidation mixture may be regulated if desired at relatively low values by the addition of diluents other than nitrogen from the air; for this purpose, a portion of the recycle stream may be satisfactory. The extent of dehydration of the added oxygen-containing gas and recycle gas may also be regulated according to the benefits obtained thereby over specific catalyst compositions.

While a number of catalysts comprising noble metals are useful for the oxidation of olefins, the preferred compositions for the process described are supported silver catalysts comprising silver, with or without small amounts of promoter metals, deposited on an adsorbent carrier such as alumina, aluminum silicates, or silica gel. These catalysts may be prepared by impregnation of the carrier with a metal salt solution, followed by reduction to the metallic state. These catalysts are highly active at temperatures in the range of 300 to 900° F., and a preferred temperature range may be from 600 to 800° F. The catalyst may be arranged in a plurality of tubes of small diameter in order that the temperature control by the externally-circulating heat exchange fluid may be more sensitive.

The indicated treatment of the partially oxidized effluents from the oxidation catalyst is also one of several possible arrangements. The absorbing fluids or selective solvents are most efficient at atmospheric temperatures and the stripping column may be operated accordingly. Superatmospheric pressures in the absorption step are usually favorable and may be maintained after the oxidation step or obtained by compression of the effluent gas from the oxidation chamber. The unabsorbed gases containing nitrogen and some residual ethylene are conveniently treated by the recycle arrangement indicated wherein a portion of this stream may be dried and recycled directly to the oxidation chamber to regulate the ethylene content of the incoming feed. The absorber may conveniently be a packed tower to increase absorption efficency, and the solvent may be water or aqueous solution of alcohols or glycols, or the latter alone. In some cases it may be preferred to use a solid adsorbent such as activated charcoal instead of a selective liquid solvent.

Conventional stripping methods are employed to recover the ethylene oxide from a liquid solvent, and the usual heat exchange arrangements may be furnished to reduce the external heat requirements. The recovered ethylene oxide may be used immediately after removal of any traces of water or solvent. If surge capacity is necessary, the ethylene oxide may be stored to be withdrawn as needed.

In effecting the reaction between ethylene and ethylene oxide in the next stage of the process, special provisions are made for suitable physical characteristics in the catalyst, and for controlling the reaction time. These include the use of a solid-type catalyst in which the metal halide chosen for the process may be supported by an adsorbent carrier and substantially completely retained thereon during contact with the reactant mixture. The reaction time with a catalyst of this type is satisfactorily controlled by regulation of the flow rate of reactant fluid as well as by the use of inert diluents in the reactant stream.

The catalysts suitable for promoting the condensation are the active metal halides sometimes classified as Friedel-Crafts catalysts and including the chlorides and/or bromides of zinc, iron and aluminum and boron fluoride. Of these materials, iron (ferric) and aluminum chlorides are suitably active and adaptable to incorporation into the type of catalyst preferred. The adsorbent carrier materials are chosen on the basis of high porosity and adsorptive capacity, both of which contribute to the retention of the metal chloride on the carrier surfaces. The carriers are usually employed in substantially dehydrated form since the adsorptive capacity and the activity of the reagent are favorably affected by dehydration. The catalyst particles are of a size suitable for the passage of the reactant fluid with efficient contact but without excessive pressure drop. These particles may be granules bearing the metal halide on the porous surfaces, or pellets or compressed pills of comminuted metal halide and finely divided adsorbent. In some cases it may be desirable to sublime aluminum chloride onto the adsorbent carrier or to fuse mixture of the granular carrier with ferric chloride to impregnate the adsorbent material with the chemical. Suitable carrier materials for the catalyst preparation may be prepared from bauxite, brucite, activated clay-type minerals, silica gel, and synthetic oxides, such as alumina and zirconia.

The fluid mixture which is treated over the metal halide catalyst is prepared by proportioning and mixing the ethylene and ethylene oxide in the desired mole ratio and passing the mixture alone or with diluents and/or catalyst promoting agents through the reactor. The ethylene concentrate contains no other unsaturates and the small quantities of methane and ethane which may be present are substantially inert diluents. The temperature of the catalyst is maintained at low atmospheric or subatmospheric temperatures of 10 to about 110° F., with the preferred values within this range depending somewhat on the catalyst employed and the extent of conversion per pass. With aluminum chloride catalysts temperatures of 10 to about 50° F. are generally satisfactory.

Pressures in this stage of the process are superatmospheric pressures of 50 to 1000 pounds gage. Preferred pressures with the more active catalysts are ordinarily 50 to 150 pounds gage for vapor-phase reaction, while in treating liquid reactant mixtures at temperatures up to about 40° F. pressures of 400 to 500 pounds are required.

The contact or reaction time will depend to a large extent on the desired conversion per pass and on whether liquid or vaporous reactant mixtures are employed. In general, it is preferred to limit the contact time to values which suppress undesirable side reactions and to recycle substantial volumes of the reactant stream to maintain the ultimate conversion. With liquid reactants, flow rates of 0.5 to 10 or more liquid volumes per hour per volume of catalyst may be employed, while with vapor mixtures space velocities corresponding to contact time of 10 to about 300 seconds are usually satisfactory.

This procedure requires somewhat larger equipment for a given production, but often is economical from the standpoint of improved yields.

The reactant mixture which is passed over the condensation catalyst usually comprises a major proportion of ethylene and the proportion of ethylene oxide is limited to low values which may range from less than one to about 10 volume per cent of the mixture, with values in the lower part of this range preferred in most cases. The weight per cent of ethylene oxide in the reactant mixture varies correspondingly from about one to about 15 per cent of the mixture. With feed compositions of very low ethylene oxide content, side reactants are minimized and better yields based on the ethylene oxide are obtained. The recycle rates are, therefore, relatively high in this type of operation.

Provision is ordinarily made for an internal and/or an external recycle in this catalytic condensation reaction. Thus, as has been pointed out in connection with the flow diagram, a portion of the catalyst effluent may be recycled directly back to the inlet stream to build up a desired concentration of reaction products. Additional amounts of ethylene oxide may be added into this recycle stream, or ethylene oxide may be added at a number of spaced points along the catalyst vessel to maintain the concentration of this component in the reactant fluid mixture. Concurrently, a portion of the effluent stream may be taken to processing equipment wherein the butadiene is separated and the residual fluid is returned to the catalyst with make-up ethylene oxide. Usually, both methods are utilized to a degree depending on the feed composition and reaction time so that both the extent of conversion in the catalyst zone and the concentration of reaction products in the internal recycle stream are carefully limited.

Since the condensation reaction is concurrent to a variable extent with the dehydration of any ethylenic alcohols formed in the reaction, it is ordinarily preferred to maintain the catalyst in a relatively dry condition. This involves the preparation of the catalyst in substantially anhydrous form and the drying of the feed and recycle vapors. The solid-type catalyst incorporating an adsorbent carrier and the essentially controlled conversion per pass both tend to prolong the operating cycle and the activity of the catalyst. With aluminum chloride catalysts and the like, the activity may often be promoted by the addition of minor amounts of hydrogen chloride along with the reactant vapor mixture.

The reaction products withdrawn at the outlet from the condensation catalyst may be treated in a variety of ways to recover as far as is economical unconverted reactants as well as the desired product. After the separation of any high-boiling material or tarry polymeric residues, conventional extraction methods for diolefin recovery may be applied directly to the effluents, preferably in liquid phase. Alternately, a preliminary fractionation to separate ethylene followed by such specific treatment as solvent extraction cuprous halide extraction, and the like may be practiced.

The following exemplary operation will serve to further illustrate specific steps in the practice of the invention to produce butadiene from ethylene.

An ethylene-rich feed stock was segregated from the light gas products of the high temperature-low pressure pyrolysis of a $C_2$-$C_3$ hydrocarbon mixture. This feed stock was further concentrated by demethanization at low temperature and an ethylene concentrate containing 90-95 volume per cent of ethylene was obtained with the balance principally ethane and some methane.

A portion of the ethylene concentrate was supplied to the catalytic oxidation step in which controlled concentrations of ethylene in the presence of excess oxygen were oxidized over a supported metallic silver catalyst at a temperature of 600° F. to produce ethylene oxide. The ethylene concentration in the feed to the oxidation step was controlled through recycle of relatively large volumes of the residue gas from the ethylene oxide removal step.

Ethylene oxide separation from the partially oxidized gas mixture was accomplished by absorption of the product at atmospheric temperatures in water. The ethylene oxide was then recovered from the aqueous solution and dried and stored for use in the condensation step. The feed to this step was prepared by mixing the ethylene concentrate with a minor proportion of ethylene oxide to prepare a mixture of the following approximate composition:

| | Volume per cent |
|---|---|
| Ethylene | 85.7 |
| Ethylene oxide | 5.0 |
| Inert material ($C_2H_6$ etc.) | 9.2 |

This mixture was passed at a flow rate of about 5 liquid volumes of charge per hour per volume of catalyst at a temperature of 30° F. and a pressure of 500 pounds gage. The catalyst was prepared from calcined bauxite and anhydrous aluminum chloride by subliming sufficient of the aluminum chloride onto the carrier to represent 25 weight per cent of the mixture. The effluent stream at the exit of the catalyst case was split into two equal parts and one part was recycled to the catalyst with sufficient fresh feed to restore the original charge volume. The other part was taken to processing equipment for recovery of reaction products. The composition of the feed stream was not greatly altered by the inclusion of the directly recycled reactant fluid since the conversion per pass was limited to about 40 per cent of the ethylene oxide in the reactant mixture. Thus, after the recycle was established, the ethylene oxide content of the charge was maintained at about 4 volume per cent.

The portion of the stream withdrawn from the catalytic treatment was fractionated to remove traces of heavy polymer, and the overhead fraction was condensed and treated for the recovery of butadiene by means of cuprous chloride reagent. The residual liquid was then freed of copper and recycled to the process.

When substantially the same feed mixture was treated in vapor phase over an aluminum chloride catalyst, a contact time of 300 seconds was employed at a temperature of 50° F. and a pressure of 60 pounds gage. Conversion per pass was about 30 per cent of the ethylene oxide in the feed. In this adaptation of the process, one half of the catalyst effluent was withdrawn and fractionated to remove traces of heavy material. The overhead vapors were partially condensed, with the major portion of the ethylene concentrate being vented from the reflux accumulator. The condensate was then fractionated to recover concentrated butadiene. It is obvious other low boiling olefins may be reacted in accordance with the present invention to produce corresponding diolefins.

Having thus disclosed and specifically illustrated my invention, the following are my claims:

1. A process for the production of butadiene from ethylene which comprises admixing an oxygen-containing gas with ethylene, passing the resulting mixture into contact with an oxidation catalyst under conditions suitable for conversion of ethylene to ethylene oxide, separating ethylene oxide in substantially pure form from the effluent of said oxidation catalyst, admixing said ethylene oxide with ethylene to produce a mixture of ethylene and ethylene oxide containing a major proportion of ethylene and a minor proportion of ethylene oxide, and passing said mixture at temperatures in the range of 10 to 50° F. and at pressures of 50 to 500 pounds per square inch gage into contact with a catalyst of the Friedel-Crafts type to effect conversion of at least a portion of the ethylene and ethylene oxide to butadiene.

2. The process of claim 1 in which the Friedel-Crafts type catalyst consists of aluminum chloride.

3. The process for the production of butadiene which comprises admixing ethylene with ethylene oxide to form a mixture containing a major proportion of ethylene and a minor proportion of ethylene oxide, and passing said mixture at temperatures in the range of 10 to 110° F. and at a pressure within the range of 50 to 500 pounds per square inch gage into contact with a catalyst of the Friedel-Crafts type to effect conversion of at least a portion of the mixture to butadiene.

4. The process of claim 3 in which the Friedel-Crafts catalyst is aluminum chloride.

5. The process for the production of butadiene which comprises admixing ethylene and ethylene oxide to form a mixture containing a major proportion of ethylene and a minor proportion of ethylene oxide, and passing said mixture at temperatures in the range of 10 to 50° F. and at a pressure within the range of 50 to 500 pounds per square inch gage into contact with aluminum chloride in the presence of hydrogen chloride as a promoter effecting conversion of at least a portion of said mixture to butadiene.

6. The process for the production of butadiene which comprises admixing ethylene, ethylene oxide, and hydrogen chloride to form a mixture containing a major proportion of ethylene, a minor proportion of ethylene oxide within the range of 1 to 10 volume per cent of the mixture, and a minor proportion of hydrogen chloride; passing said mixture at temperatures within the range of 10 to 50° F. and at a pressure within the range of 50 to 500 pounds per square inch gage into contact with aluminum chloride catalyst effecting conversion of at least a portion of the ethylene and ethylene oxide in said mixture to butadiene; dividing the effluent of the catalyst into two streams; recycling one stream directly to the catalyst; recovering butadiene from the second stream; and recycling the remainder of the second stream to the catalyst.

WALTER A. SCHULZE.